United States Patent
Yoon et al.

(10) Patent No.: US 7,793,833 B2
(45) Date of Patent: Sep. 14, 2010

(54) APPARATUS AND METHOD FOR PHOTOGRAPHING A BUSINESS CARD IN PORTABLE TERMINAL

(75) Inventors: Sung-Kyu Yoon, Seoul (KR); Eung-Seo Shin, Seoul (KR)

(73) Assignee: Samsung Electronics Co., Ltd. (KR)

( * ) Notice: Subject to any disclaimer, the term of this patent is extended or adjusted under 35 U.S.C. 154(b) by 716 days.

(21) Appl. No.: 11/799,858

(22) Filed: May 3, 2007

(65) Prior Publication Data

US 2007/0262148 A1    Nov. 15, 2007

(30) Foreign Application Priority Data

May 11, 2006    (KR)    ...... 10-2006-0042440

(51) Int. Cl.
*G06K 5/00*    (2006.01)

(52) U.S. Cl. ........ 235/380; 235/494; 235/454; 235/375

(58) Field of Classification Search ........ 235/454, 235/494, 380, 375
See application file for complete search history.

(56) References Cited

U.S. PATENT DOCUMENTS

| | | | |
|---|---|---|---|
| 2003/0095709 A1* | 5/2003 | Zhou | ............... 382/190 |
| 2004/0100572 A1 | 5/2004 | Kim | |
| 2004/0201720 A1 | 10/2004 | Robins et al. | |
| 2004/0208372 A1 | 10/2004 | Boncyk et al. | |
| 2004/0218916 A1 | 11/2004 | Yamaguchi et al. | |
| 2005/0134692 A1* | 6/2005 | Izumi | ............... 348/207.99 |
| 2005/0281452 A1 | 12/2005 | Usikov | |
| 2008/0062263 A1* | 3/2008 | Shiu et al. | ............... 348/96 |

FOREIGN PATENT DOCUMENTS

| | | |
|---|---|---|
| KR | 1020050091387 | 9/2005 |
| KR | 1020060050729 | 5/2006 |
| KR | 1020060050746 | 5/2006 |
| KR | 1020060031569 | 6/2006 |

* cited by examiner

*Primary Examiner*—Edwyn Labaze
(74) *Attorney, Agent, or Firm*—The Farrell Law Firm, LLP

(57) ABSTRACT

Provided are an apparatus and method for photographing a business card in a portable terminal. The method includes recognizing boundary lines of the business card from an image received from a camera when a recognition and photographing key for a business card is selected, and allowing the business card to be automatically photographed by using the recognized boundary lines.

14 Claims, 3 Drawing Sheets

APPARATUS AND METHOD FOR PHOTOGRAPHING A BUSINESS CARD IN PORTABLE TERMINAL

PRIORITY

This application claims priority under 35 U.S.C. §119 to an application filed in the Korean Intellectual Property Office on May 11, 2006 and assigned Ser. No. 2006-42440, the contents of which are incorporated herein by reference.

BACKGROUND OF THE INVENTION

1. Field of the Invention

The present invention relates generally to a portable terminal, and in particular, to an apparatus and method for allowing a business card to be automatically photographed by detecting the boundary lines of the business card.

2. Description of the Related Art

In general, most persons exchange their business cards presenting their simple profiles and contacts when they meet a guest for the first time. In this way, tens of business cards may be exchanged each day. In this case, a person must keep and manage the received business cards in a business card case or a purse by himself/herself, and search all the business cards in order to find the business card of a specific guest.

Accordingly, portable terminals which have recently been developed are capable of photographing a business card using a camera, and providing a business card recognition function in order to recognize the business card and manage information regarding the owner of the business card. In this case, similarly to a general photographing process, the business card is photographed based on a user's subjective judgment without limiting the size and location of the business card that is to be displayed on a display unit of the portable terminal. In other words, the user photographs the business card by adjusting the size and location of the business card that is to be displayed on the display unit of the portable terminal by manually moving the portable terminal, and selecting a key button or a menu for photographing the business card when the adjusted size and location of the business card are determined to be appropriate for photographing.

In the business card recognition function, the probability of satisfactorily recognizing the business card in order to obtain the information contained in the business card varies depending on photographing conditions, such as the size, brightness, and image quality of the photographed business card. Thus, as described above, when the user photographs the business card based on his/her subjective judgment, the business card may be photographed to be too large, small or dark, thereby lowering the probability of satisfactorily recognizing the business card. Also, as described above, when the user manually selects a key button or a menu in order to photograph the business card, shaking may occur due to the selecting of the key button or the menu, and thus, shaking noise may be present in an image of the photographed business card, thereby significantly lowering the probability of satisfactorily recognizing the business card.

SUMMARY OF THE INVENTION

An aspect of the present invention is to substantially solve at least the above problems and/or disadvantages and to provide at least the advantages below. Accordingly, an aspect of the present invention is to provide an apparatus and method for photographing a business card in a portable terminal.

Another aspect of the present invention is to provide an apparatus and method for allowing a business card to be automatically photographed by recognizing the boundary lines of the business card in a portable terminal.

A further aspect of the present invention is to provide an apparatus and method for photographing a business card in a portable terminal by providing a user with an environment appropriate for photographing the business card.

According to one aspect of the present invention, there is provided a method of photographing a business card in a portable terminal, the method including recognizing boundary lines of the business card from an image received from a camera when a key for recognizing and photographing the business card is selected, and allowing the business card to be automatically photographed by using the recognized boundary lines.

According to another aspect of the present invention, there is provided an apparatus for photographing a business card in a portable terminal, the apparatus including an image processor that recognizes boundary lines of the business card from an image received from a camera when a menu for recognizing and photographing the business card is selected, and a controller that controls the business card to be automatically photographed using the recognized boundary lines.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail when it is determined that they would obscure the invention in unnecessary detail.

The present invention provides a user with an environment appropriate for photographing a business card, and an apparatus and method for allowing a business card to be automatically photographed by recognizing the boundary lines of the business card.

Figure 1:
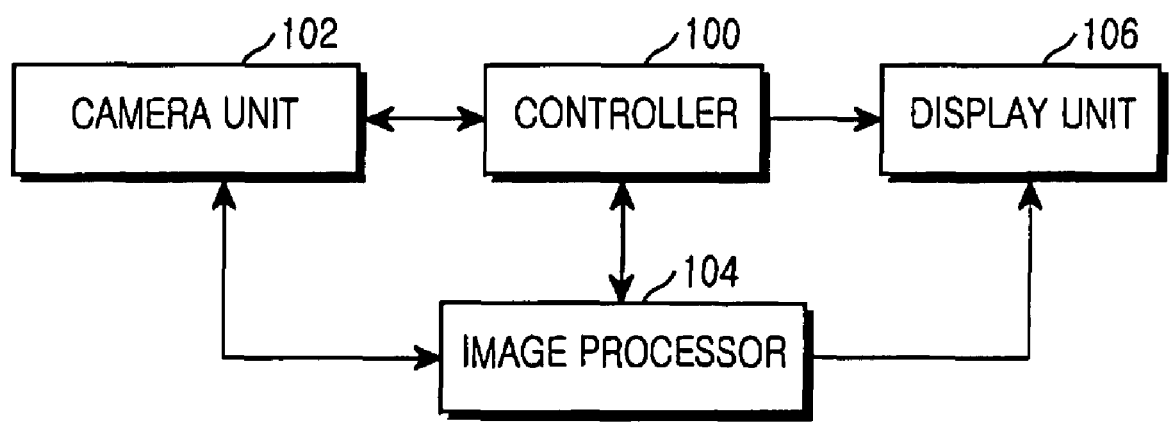
FIG. 1 is a block diagram of a portable terminal according to the present invention.

FIG. 1 is a block diagram of a portable terminal according to the present invention. Referring to FIG. 1, the portable terminal includes a controller 100, a camera unit 102, an image processor 104, and a display unit 106. The controller 100 performs processing or controlling in order to establish a voice/data communications. In particular, in order to photograph a business card, the controller 100 receives brightness data from the camera unit 102, checks a brightness environment under which the business card is to be photographed, and controls whether to perform automatic photographing on the business card. Also, the controller 100 displays on the display unit 106 reference boundary lines, for presenting a size and location, of a business card, which are appropriate for recognizing the business card; and determines whether the boundary lines of the business card received from the image processor 104 coincide with the reference boundary lines. If they coincide with one another, the controller 100 controls automatic photographing to be performed.

The camera unit 102 includes a camera sensor that converts an optical signal, which is sensed when an image is photographed, into an analog image signal; and a signal processor that converts the analog image signal into a digital data. The camera unit 102 outputs the digital data into which the analog image signal has been converted, to the image processor 104. Also, the camera unit 102 converts the brightness of an image received from the camera sensor into measurable brightness data, and transmits the brightness data to the controller 100. Here, the camera sensor may be embodied as a Charge Coupled Device (CCD) sensor, and the signal processor may be embodied as a Digital Signal Processor (DSP).

The image processor 104 processes the digital data received from the camera unit 102 in units of frames, and outputs the result of processing to be appropriate for the characteristics and size of the display unit 106. Also, the image processor 104 includes a video codec that codes an image signal in a predetermined format or decodes coded frame image data to the original frame image data. When a business card is photographed, the image processor recognizes the boundary lines of an image received from the camera unit 102, and detects a location where each of the boundary lines of the business card is recognized and provides the result of detecting to the controller 100 when the boundary lines are recognized. Here, the locations of the boundary lines of the business card may be detected by extracting the contour of the business card by using an algorithm, such as Sobel, Prewitt, Robert, or Laplacian algorithms.

The display unit 106 displays status information and characters (which consist of limited numbers) generated during the operation of the portable terminal. In particular the display unit 106 outputs an image received from the image processor 104, displays the reference boundary lines for the business card under control of the controller 100, and changes and displays the color, shape or thickness of each of the reference boundary lines.

Figure 2:
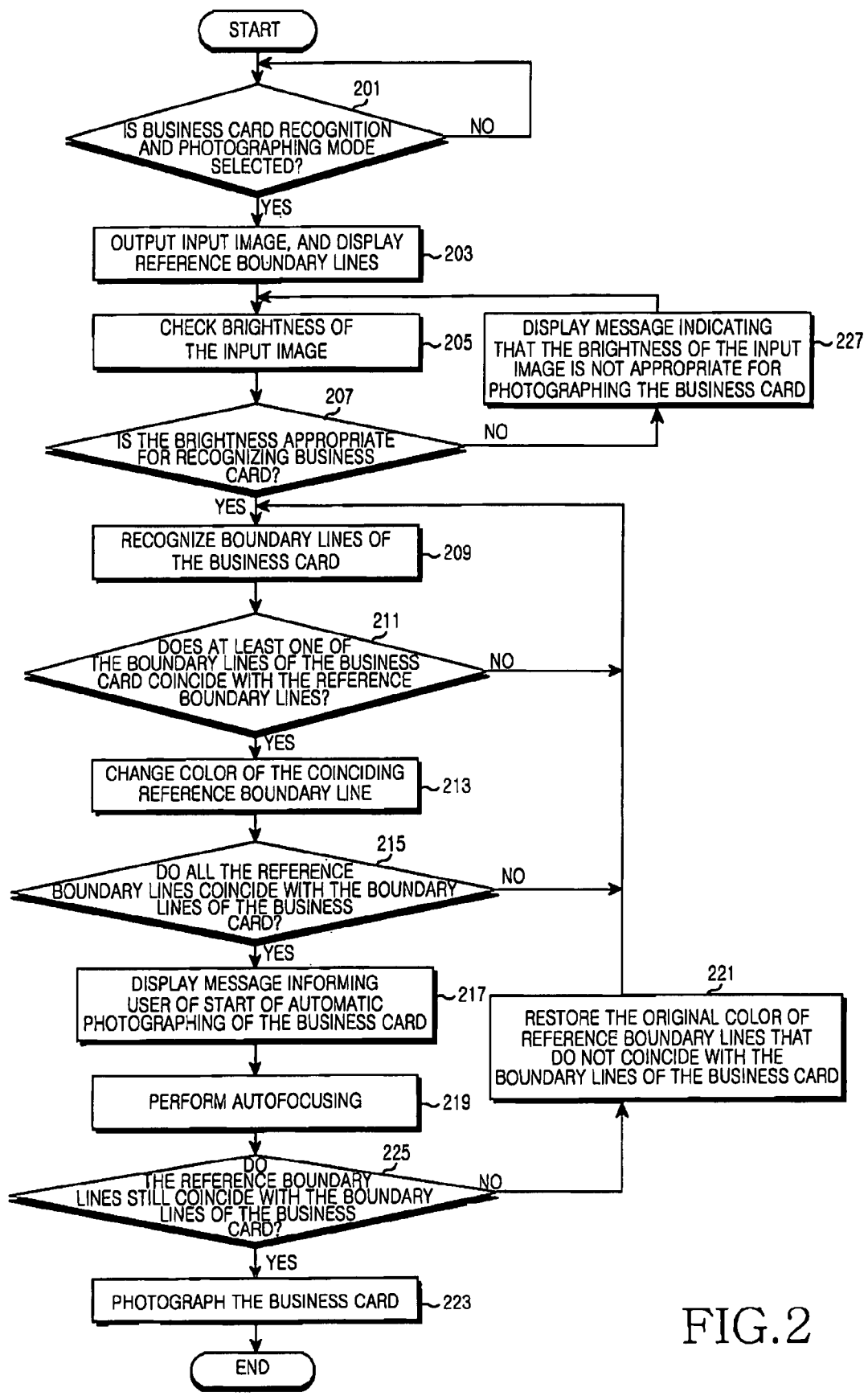
FIG. 2 is a flowchart illustrating a method of photographing a business card in a portable terminal, according to the present invention.

FIG. 2 is a flowchart illustrating a method of photographing a business card in a portable terminal, according to an embodiment of the present invention.

Figure 3A:
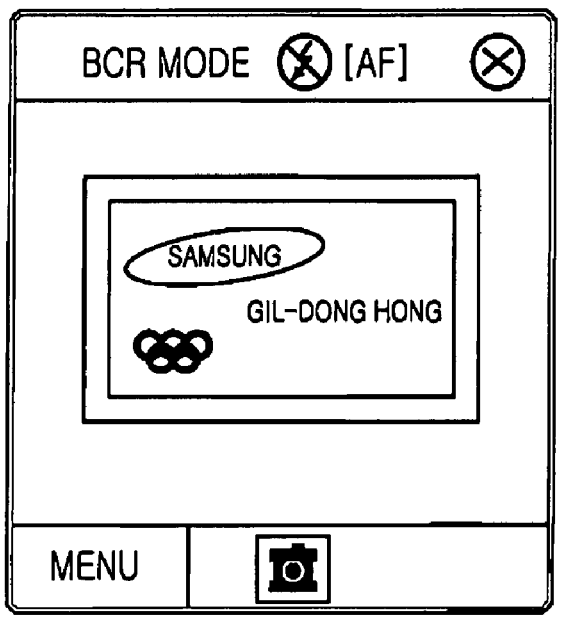
FIG. 3 illustrates screen images illustrating photographing a business card in a portable terminal, according to the present invention.

Referring to FIGS. 1 and 2, first, the portable terminal determines whether a business card recognition and photographing mode has been selected, in step 201. If it is determined that the business card recognition and photographing mode has been selected, the portable terminal outputs an image received from the camera sensor to the display unit 106, and displays on the display unit 106 reference boundary lines for appropriately fixing the size and location of the business card that is to be photographed in step 203. For example, as illustrated in FIG. 3A, boundary lines for presenting a size and location of a business card, which are appropriate for recognizing the business card, are displayed as a rectangular frame in the center of the display unit 106. Here, the reference boundary lines present a location and size, of a business card, for achieving the highest probability of satisfactorily recognizing the business card; and may be obtained through an experiment.

Next, the portable terminal checks brightness data from the received image in step 205, and determines whether the current brightness of the image is appropriate for photographing the business card, that is, for recognizing the business card, based on the brightness data in step 207. Here, whether the current brightness is appropriate for photographing the business card may be determined by comparing the brightness data with a reference brightness value for recognizing the business card.

If it is determined that the current brightness is not appropriate for photographing the business card, the portable terminal displays a message indicating this fact on the display unit 106 in step 227, and then returns to operation 205. If it is determined that the current brightness is appropriate for photographing the business card, the portable terminal recognizes the boundary lines of the business card by analyzing an image received from the camera sensor in step 209. Next, the portable terminal proceeds to operation 211, and determines whether at least one of the reference boundary lines (upper, lower, left, and right boundary lines) coincides with the boundary lines of the photographed business card. Here, a predetermined margin of error is allowed when determining whether the reference boundary lines coincide with the boundary lines of the business card. For example, if the predetermined margin of error is 3 mm, the left boundary line of the business card can be determined to coincide with the left reference boundary line when the top (or bottom) of the left boundary line of the business card is 2 mm away from the top (or bottom) of the left reference boundary line in a vertical or horizontal direction.

Figure 3B:
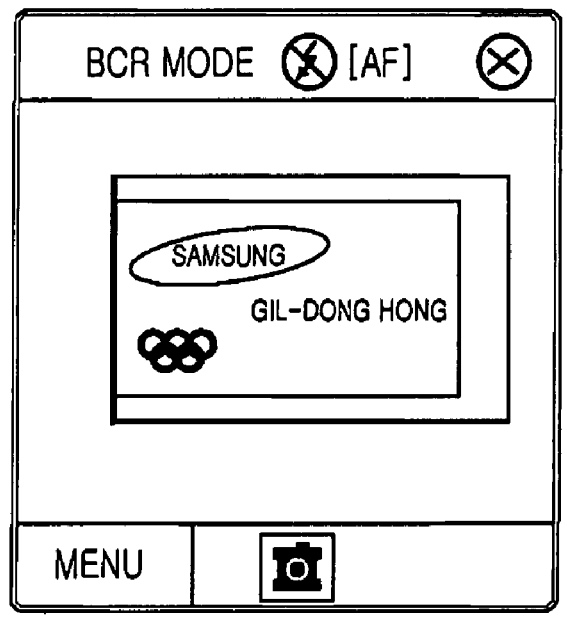
Figure 3C:
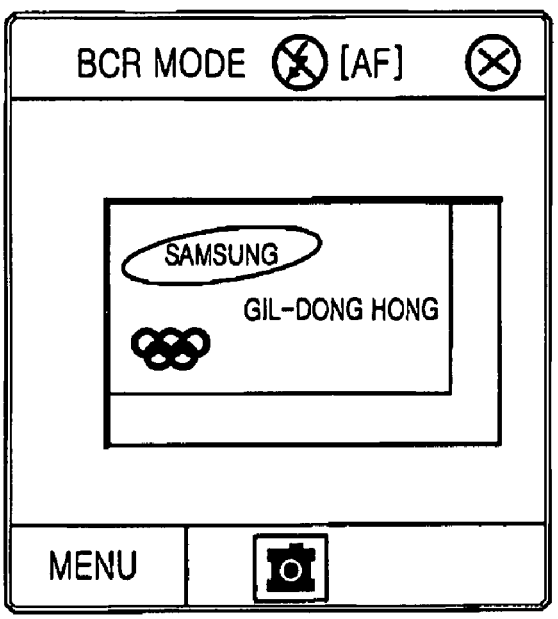

If none of the reference boundary lines coincides with the boundary lines of the business card, the portable terminal returns to step 209. If at least one of the reference boundary lines coincides with the boundary lines of the business card, the portable terminal proceeds to step 213, and replaces the color of the coinciding reference boundary line with a predetermined color. For example, as illustrated in FIG. 3B, when one of the boundary lines of the photographed business card coincides with the left reference boundary line, the color of the left reference boundary line may be replaced with a predetermined, different color. If the boundary lines of the photographed business card coincide with the left and upper reference boundary lines, the colors of the left and upper reference boundary lines may be replaced with a predetermined, different color (FIG. 3C).

Figure 3D:
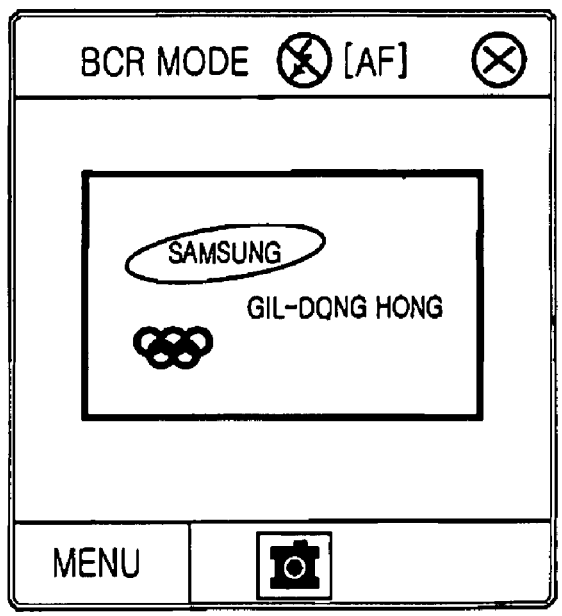

Next, the portable terminal determines whether all the upper, lower, left and right reference boundary lines coincide with the boundary lines of the business card in step 215. If all the reference boundary lines do not coincide with all the boundary lines of the business card, the portable terminal returns to step 209. If all the reference boundary lines completely coincide with the boundary lines of the business card as illustrated in FIG. 3D, the portable terminal proceeds to step 217 and displays a message informing the user of the start of automatic photographing for the business card. Here, it is possible to inform the user of the start of automatic photographing by generating a predetermined alarm sound of automatic photographing or changing the shapes, thicknesses or colors of the reference boundary lines.

Next, the portable terminal performs auto focusing in order to photograph the business card in step 219. Next, the portable terminal determines whether the reference boundary lines still coincide with the boundary lines of the business card even after performing auto focusing in step 225. If at least one of the reference boundary lines does not coincide with the boundary lines of the business card, the portable terminal changes the current color of the at least one reference boundary line, which does not coincide with the boundary lines of the business card, to a default color, i.e., the original color of the reference boundary line being initially displayed on the display unit 106 in step 221, and then returns to step 209. However, if all the reference boundary lines still coincide with all the boundary lines of the business card, the portable terminal photographs the business card in step 223, and ends the processes of the present invention.

In the current embodiment of the present invention, if the reference boundary lines coincide with the boundary lines of the business card, the colors of the coinciding reference boundary lines are replaced with a default color. However, the thicknesses or shapes of the coinciding reference boundary lines may be changed.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

As described above, according to the present invention, it is possible to allow a business card to be automatically photographed in a portable terminal by recognizing the boundary lines of the business card, thereby preventing shaking when a user selects a key button or a menu in order to photograph the business card. Further, it is possible to improve the probability of satisfactorily recognizing the business card by achieving a business card image having a size, location, and brightness that are appropriate for recognizing the business card.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of photographing a business card in a portable terminal, the method comprising:
    recognizing boundary lines of the business card from an image received from a camera when a recognition and photographing key for a business card is selected;
    displaying, on a display unit, predetermined reference boundary lines and the image having the recognized boundary lines of the business card;
    determining whether the recognized boundary lines of the business card coincide with the predetermined reference boundary lines; and
    automatically photographing the business card, when the recognized boundary lines of the business card coincide with the predetermined reference boundary lines.

2. The method of claim 1, when at least one of the recognized boundary lines of the business card coincides with the predetermined reference boundary lines, further comprising changing the at least one coinciding predetermined reference boundary line according to a predetermined method.

3. The method of claim 2, wherein the predetermined method comprises changing at least one of a color, shape, and thickness of the coinciding predetermined reference boundary line.

4. The method of claim 1, when the recognized boundary lines of the business card coincide with the predetermined reference boundary lines, further comprising informing a user that automatic photographing of the business card is to be performed.

5. The method of claim 4, wherein informing of the automatic photographing comprises changing at least one of a shape, thickness, and color of the coinciding predetermined reference boundary lines.

6. The method of claim 4, wherein informing of the automatic photographing comprises at least one of generating an alarm sound and displaying a message.

7. The method of claim 1, wherein automatically photographing the business card comprises:
    performing auto focusing when the recognized boundary lines of the business card coincide with the predetermined reference boundary lines;
    determining whether the recognized boundary lines of the business card still coincide with the predetermined reference boundary lines after performing auto focusing; and
    automatically photographing the business card when the recognized boundary lines of the business card still coincide with the predetermined reference boundary lines.

8. The method of claim 1, further comprising:
    when the recognition and photographing key is selected, determining whether a brightness of the image received from the camera satisfies a predetermined condition; and
    when it is determined that the brightness of the image does not satisfy the predetermined condition, displaying a message requesting brightness control.

9. An apparatus for photographing a business card in a portable terminal, the apparatus comprising:
    an image processor for recognizing boundary lines of the business card from an image received from a camera when a menu for recognizing and photographing the business card is selected;
    a display unit for displaying predetermined reference boundary lines and the image having the recognized boundary lines of the business card when the menu for recognizing and photographing the business card is selected; and
    a controller for automatically photographing the business card when the recognized boundary lines of business card coincide with the predetermined reference boundary lines.

10. The apparatus of claim 9, wherein the controller performs auto focusing when the recognized boundary lines of the business card coincide with the predetermined reference boundary lines.

11. The apparatus of claim 9, wherein the display unit displays a change in at least one coinciding predetermined reference boundary line according to a predetermined method when at least one of the recognized boundary lines of the business card coincides with the predetermined reference boundary lines.

12. The apparatus of claim 11, wherein the predetermined method comprises changing at least one of a color, shape, and thickness of the coinciding predetermined reference boundary line.

13. The apparatus of claim 9, further comprising a camera unit for extracting brightness data from the image received from the camera, and providing the brightness data to the controller,
    wherein the controller compares the brightness data with a reference brightness value, and displays a message requesting brightness control on the display unit when the brightness data is less than the reference brightness value.

14. A computer-readable recording medium having recorded thereon a program for photographing a business card in a portable terminal, comprising:
   a first code segment, for recognizing boundary lines of the business card from an image received from a camera when a recognition and photographing key for a business card is selected;
   a second code segment for displaying, on a display unit, predetermined reference boundary lines and the image having the recognized boundary lines of the business card;
   a third code segment for determining whether the recognized boundary lines of the business card coincide with the predetermined reference boundary lines; and
   a fourth code segment, for automatically photographing the business card, when the recognized boundary lines of the business card coincide with the predetermined reference boundary lines.

* * * * *